United States Patent
Bediako et al.

(10) Patent No.: US 9,684,691 B1
(45) Date of Patent: *Jun. 20, 2017

(54) SYSTEM AND METHOD TO FACILITATE THE ASSOCIATION OF STRUCTURED CONTENT IN A STRUCTURED DOCUMENT WITH UNSTRUCTURED CONTENT IN AN UNSTRUCTURED DOCUMENT

(71) Applicant: Ez-XBRL Solutions, Inc., Manassas, VA (US)

(72) Inventors: George Bediako, Washington, DC (US); Srinivas Murty, Culpeper, VA (US)

(73) Assignee: Ez-XBRL Solutions, Inc., Manassas, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,869

(22) Filed: Aug. 25, 2015

Related U.S. Application Data

(63) Continuation of application No. 13/599,253, filed on Aug. 30, 2012, now Pat. No. 9,135,327.

(51) Int. Cl.
*G06F 7/00* (2006.01)
*G06F 17/30* (2006.01)

(52) U.S. Cl.
CPC .. *G06F 17/30424* (2013.01); *G06F 17/30011* (2013.01); *G06F 17/30598* (2013.01); *G06F 17/30634* (2013.01)

(58) Field of Classification Search
CPC .......... G06F 17/3061; G06F 17/30424; G06F 17/30598; G06F 17/30011; G06F 17/30634

USPC ......................................................... 707/811
See application file for complete search history.

(56) References Cited

U.S. PATENT DOCUMENTS

| | | |
|---|---|---|
| 7,415,482 B2 | 8/2008 | Blake |
| 7,475,337 B1 | 1/2009 | Huang |
| 7,739,588 B2 | 6/2010 | Reynar |
| 7,805,474 B2 | 9/2010 | Warshavsky |
| 7,822,768 B2 | 10/2010 | Maymir-Ducharme |
| 7,849,030 B2 | 12/2010 | Ellingsworth |
| 7,917,841 B2 | 3/2011 | Chopin et al. |

(Continued)

*Primary Examiner* — Van Oberly
(74) *Attorney, Agent, or Firm* — Sheppard Mullin Richter & Hampton LLP

(57) ABSTRACT

This disclosure relates to facilitating the association of structured content in a structured document with unstructured content in an unstructured document. The system described herein may be configured to facilitate the association by linking numeric instances in the structured document to corresponding numeric instances in the unstructured document. In some implementations, the system may be configured to link the numeric instances in the structured document to the corresponding numeric instances the unstructured document based on a uniqueness of the numeric instances in the structured document, structural information assigned to non-unique numeric instances, structural information assigned to unique numeric instances related to the non-unique numeric instances, unstructured contextual information related to non-unique numeric instances, and/or other information. In some implementations, the system may include one or more of one or more processors, a user interface, a display, electronic storage, and/or other components.

22 Claims, 3 Drawing Sheets

(56) References Cited

U.S. PATENT DOCUMENTS

| | | |
|---|---|---|
| 8,099,370 B2 | 1/2012 | Ohata |
| 8,266,148 B2 | 9/2012 | Guha |
| 8,375,291 B2 | 2/2013 | Howell et al. |
| 8,719,308 B2 | 5/2014 | Xiong |
| 8,849,843 B1 | 9/2014 | George et al. |
| 9,047,346 B2 | 6/2015 | Cutting |
| 2002/0124018 A1 | 9/2002 | Fifield et al. |
| 2003/0037038 A1 | 2/2003 | Block et al. |
| 2003/0041077 A1 | 2/2003 | Davis et al. |
| 2003/0212527 A1 | 11/2003 | Moore |
| 2003/0212544 A1 | 11/2003 | Acero et al. |
| 2003/0220795 A1 | 11/2003 | Arayasantiparb |
| 2004/0194009 A1* | 9/2004 | LaComb ............... G06F 17/211 715/239 |
| 2005/0004891 A1 | 1/2005 | Mahoney et al. |
| 2005/0071756 A1 | 3/2005 | Cipresso |
| 2006/0184539 A1 | 8/2006 | Blake et al. |
| 2006/0206878 A1 | 9/2006 | Uchida |
| 2006/0242624 A1 | 10/2006 | Mueller-Klingspor |
| 2007/0078877 A1 | 4/2007 | Ungar et al. |
| 2008/0140623 A1 | 6/2008 | Tien |
| 2008/0147601 A1 | 6/2008 | Chapus et al. |
| 2008/0201319 A1 | 8/2008 | McNamar |
| 2008/0215583 A1 | 9/2008 | Gunawardena |
| 2008/0250157 A1 | 10/2008 | Ohata |
| 2009/0006472 A1 | 1/2009 | Bush et al. |
| 2009/0019358 A1 | 1/2009 | Blake et al. |
| 2009/0234784 A1 | 9/2009 | Buriano et al. |
| 2009/0327336 A1 | 12/2009 | King |
| 2010/0031141 A1 | 2/2010 | Summers et al. |
| 2010/0161616 A1* | 6/2010 | Mitchell ........... G06F 17/30613 707/741 |
| 2010/0262620 A1 | 10/2010 | Mohan |
| 2010/0332478 A1 | 12/2010 | Duman |
| 2010/0332511 A1 | 12/2010 | Stockton et al. |
| 2011/0137923 A1 | 6/2011 | Koroteyev et al. |
| 2011/0161333 A1 | 6/2011 | Langseth et al. |
| 2011/0231384 A1 | 9/2011 | Koroteyev et al. |
| 2011/0270820 A1 | 11/2011 | Agarwal |
| 2011/0276873 A1 | 11/2011 | Gorur |
| 2011/0295903 A1 | 12/2011 | Chen |
| 2012/0101975 A1 | 4/2012 | Khosravy |
| 2012/0303645 A1 | 11/2012 | Kulkarni-Puranik |
| 2013/0031117 A1 | 1/2013 | Mandelstein et al. |
| 2013/0060774 A1 | 3/2013 | Shepherd |
| 2013/0124191 A1 | 5/2013 | Louis |
| 2013/0325881 A1* | 12/2013 | Deshpande ....... G06F 17/30292 707/755 |

* cited by examiner

SYSTEM AND METHOD TO FACILITATE THE ASSOCIATION OF STRUCTURED CONTENT IN A STRUCTURED DOCUMENT WITH UNSTRUCTURED CONTENT IN AN UNSTRUCTURED DOCUMENT

FIELD

This disclosure relates to facilitating the association of structured content in a structured document with unstructured content in an unstructured document.

BACKGROUND

EXtensible Business Reporting Language (XBRL) is a freely available, open, and global standard for exchanging business information. EXtensible Business Reporting Language may allow the expression of semantic meaning commonly required in business reporting. The language may be based on eXtensible Markup Language and may use the eXtensible Markup Language syntax and related eXtensible Markup Language technologies such as XML Schema, XLink, XPath, and Namespaces. The uses of eXtensible Business Reporting Language include defining and exchanging financial information, such as in a financial statement.

Typically, XBRL does not explicitly support "a posteriori" mapping of the structured XBRL document to the corporate filing source document. When portions of a source document are labeled (structured) and the resulting XBRL document is generated from those labels, the explicit links to the specific portions of the source document are lost.

SUMMARY

One aspect of the disclosure relates to a system for facilitating the association of structured content in a structured document with unstructured content in an unstructured document. The system described herein may be configured to facilitate the association by linking numeric instances in the structured document to corresponding numeric instances in the unstructured document. In some implementations, the system may be configured to link the numeric instances in the structured document to the corresponding numeric instances the unstructured document based on a uniqueness of the numeric instances in the structured document, structural information assigned to non-unique numeric instances, structural information assigned to unique numeric instances related to the non-unique numeric instances, unstructured contextual information related to non-unique numeric instances, and/or other information. In some implementations, the system may include one or more of one or more processors, a user interface, a display, electronic storage, and/or other components.

The processor may be configured to execute one or more computer program modules. The one or more computer program modules may include one or more of a document module, a fact module, a structured context module, a uniqueness module, a correlation module, a disambiguation module, a related unstructured contextual information module, a context association module, and/or other modules.

The document module may be configured to obtain documents. Obtaining the documents may include receiving documents over a communication connection, accessing documents from electronic storage, and/or obtaining documents in other ways. The documents may include structured documents, unstructured documents, and/or other types of documents. The documents obtained by the document module may include a matched set of documents. A matched set of documents may include a structured document and a corresponding unstructured document.

The fact module may be configured to identify numeric instances present in the documents obtained by the document module. Identifying a numeric instance may include locating the numeric instance in a document and determining the number expressed by the numeric instance. The number may refer to the numeric value represented by the numeric instance.

The structured context module may be configured to determine structured contextual information for the individual numeric instances identified by the fact module in the structured document. In some implementations, the structured context module may be configured to determine structured contextual information for each numeric instance in the structured document identified by the fact module. In some implementations, the structured context module may be configured to determine structured contextual information for a portion of the numeric instances in the structured document identified by the fact module.

The uniqueness module may be configured to determine the uniqueness of the individual ones of the numeric instances identified by the fact module in the structured document. In some implementations, a unique numeric instance may express a unique number relative to the other individual ones of the numeric instances in the structured document. A non-unique numeric instance may express the same number relative to one or more other individual one of the numeric instances in the structured document.

The correlation module may be configured to correlate the uniquely identified numeric instances in the structured document with corresponding numeric instances in the unstructured document. Uniquely identified numeric instances in the structured document expressing a common number with a numeric instance in the unstructured document may be correlated with the numeric instance in the unstructured document.

The disambiguation module may be configured to obtain differentiated data sets associated with one or more individual ones of the non-unique numeric instances in the structured document. The disambiguation module may be configured to obtain the differentiated data sets for one or more individual ones of the numeric instances in the structured document responsive to the uniqueness module determining that the one or more individual ones of the numeric instances in the structured document are not unique. In some implementations, the differentiated data sets may be used by the disambiguation module to differentiate the individual ones of the non-unique numeric instances from other individual ones of the non-unique numeric instances with the same numeric value. The non-unique numeric instance may be correlated with a corresponding numeric instance in the unstructured document by the correlation module based on the differentiated data set associated with the first numeric instance.

The related unstructured contextual information module may be configured to differentiate individual ones of the non-unique numeric instances responsive to the disambiguation module being unable to obtain a differentiated data set related to an individual non-unique numeric instance. The related unstructured contextual information module may differentiate the individual ones of the non-unique numeric instances based on unstructured contextual information in the unstructured document that is related to the non-unique numeric instances in the structured document.

In some implementations, the related unstructured contextual information module may be configured to determine unstructured contextual information for the individual, correlated numeric instances correlated by the correlation module. For a numeric instance in a structured document being correlated with a numeric instance in an unstructured document, the related unstructured contextual information module may be configured to determine the unstructured contextual information.

The context association module may be configured to associate the structured contextual information with unstructured contextual information for correlated numeric instances. Such correlations may include associating textual content appearing alongside a numeric instance in an unstructured document with structured information associated with a numeric instance in a structured document.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
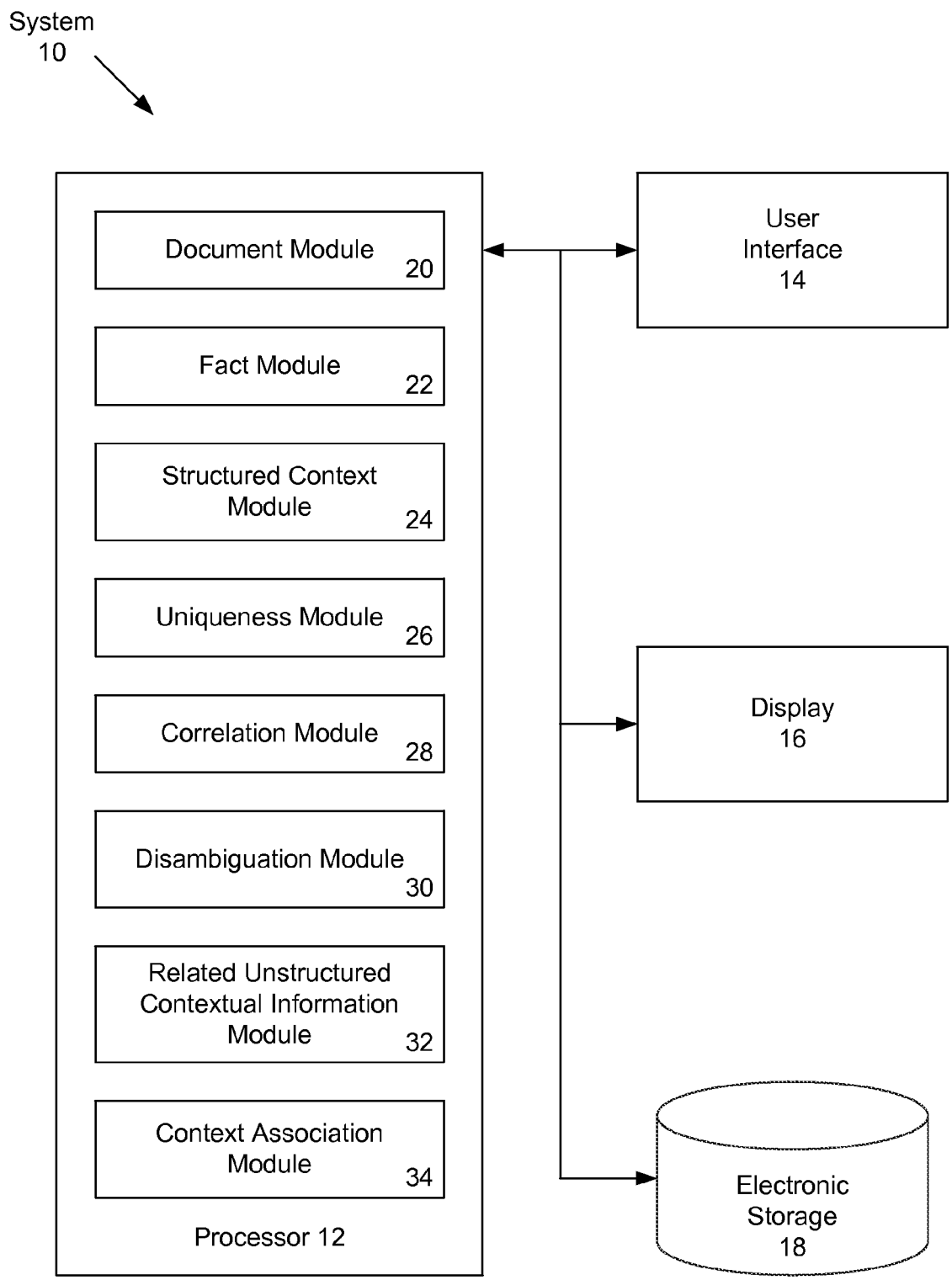
FIG. 1 is a schematic illustration of a system configured to facilitate associating structured content in a structured document with unstructured content in an unstructured document.

FIG. 1 is a schematic illustration of a system 10 configured to facilitate associating structured content in a structured document with unstructured content in an unstructured document. Structured content may include unstructured prose, numerical information, financial information, statistics, accounting tables and/or charts, and/or other information from the unstructured document that has been labeled with semantic labels. The semantic labels may be tags associated with a taxonomy. The semantic labels may be previously applied to the unstructured content in the unstructured document and/or used to label, index, categorize, and/or organize the unstructured content. By way of non-limiting example, semantic labels may be previously applied to the unstructured content using a system similar to or the same as the system described in U.S. patent application Ser. No. 13/526,336, filed Jun. 18, 2012, and entitled, "SYSTEM AND METHOD FOR FACILITATING ASSOCIATING SEMANTIC LABELS WITH CONTENT", which is hereby incorporated by reference into the present disclosure in its entirety. In some implementations, the semantic labels may be tags associated with the eXtensible Business Reporting Language (XBRL), Resource Description Framework, HyperText Markup Language, eXtensible Markup Language, and/or other taxonomies or frameworks.

In some implementations, system 10 may be configured to facilitate associating structured content in the structured document with unstructured content in the unstructured document by linking numeric instances in the structured document to corresponding numeric instances in the unstructured document (e.g., a corporate filing source document). Numeric instances may have user assigned structural information (e.g., tags) and may be represented in the structured document (an XBRL instance document, for example). Corresponding contextual information (e.g., dimensions, unit references, table column labels) from the unstructured document may be lost for the numeric instances in the structured document. System 10 may be configured to rediscover the lost unstructured contextual information associated with the numerical instances in the structured document. System 10 may be configured to link the numeric instances in the structured document to the corresponding numeric instances in the unstructured document such that the unstructured contextual information may be associated with the structured numeric instances.

In some implementations, system 10 may be configured to link the numeric instances in the structured document to the corresponding numeric instances in the unstructured document based on a uniqueness of the numeric instances in the structured document, structural information assigned to non-unique numeric instances, structural information assigned to unique numeric instances related to the non-unique numeric instances, unstructured contextual information related to non-unique numeric instances, and/or other information. In some implementations, system 10 may include one or more of one or more processors 12, a user interface 14, a display 16, electronic storage 18, and/or other components.

Processor 12 may be configured to execute one or more computer program modules. The one or more computer program modules may include one or more of a document module 20, a fact module 22, a structured context module 24, a uniqueness module 26, a correlation module 28, a disambiguation module 30, a related unstructured contextual information module 32, a context association module 34, and/or other modules.

Document module 20 may be configured to obtain documents. Obtaining the documents may include receiving documents over a communication connection (e.g., over a network), accessing documents from electronic storage 18, and/or obtaining documents in other ways. The documents may include structured documents, unstructured documents, and/or other types of documents.

Structured documents may include documents having content (e.g., tables, charts, structured constructs such as axes, hypercubes, and/or other structured content) that have been labeled with semantic labels, such as tags. In the structured documents semantic labels may include dimensions assigned to the content therein. For example, contextual parameters used to structure content may be defined as dimensions. As a more specific, but non-limiting example, the base eXtensible Business Reporting Language specification defines three dimensions: reporting period, reporting entity (e.g. a company or a division thereof), and a loosely defined reporting scenario (originally intended to distinguish between actual vs. projected facts). The structured information labeling the content, such as the semantic labels, the dimensions, and/or other structured information such as axis or axis member may be referred as structured contextual information. The structured contextual information may include attributes for numeric instances within a structured document. Such attributes may facilitate determination of the numbers expressed by the numeric instances. For example, a single number may be represented as 45,000,000, 45 (million), or 0.45 (billion), among other representations, depending on the context in which it is presented. A numeric instance may include a textual representation of a number (e.g., forty-five million). A structured document may be a document that has been given semantic structure. As such, a structured document may include content (e.g., textual content, and/or other content) and semantic structure (e.g., semantic labels, dimensions, and/or other semantic structure) that has been applied to the content.

Unstructured documents may include content with no applied semantic structure (e.g., a document that has not been labeled with semantic labels, such as tags, dimensions, and/or other semantic labels). Content within unstructured documents may include string-based content (e.g., words, numbers, and/or other content). The string-based content may be provided in prose, tables, charts, and/or other formats. The context of a numeric instance in such content may include one or more words in a sentence within which the numeric instance appears (e.g., headers, sections, subjects, verbs, adjectives, the whole sentence, a phrase, and/or other groupings of words). The context may extend to adjacent sentences, or even beyond (e.g., a paragraph or section). The context of a numeric instance in such content may include a title of a table, a column heading, other numeric instances within the same table, and/or other information. The context of a numeric instance in an unstructured document may be referred to as unstructured contextual information. By way of example, an unstructured document may include a corporate filing, financial report, or corporate performance report.

The documents obtained by document module 20 may include a matched set of documents. A matched set of documents may include a structured document and a corresponding unstructured document. A structured document that corresponds to an unstructured document may include a structured document that has been created from, and/or a structured document created based on, the unstructured document. As such, the content within the structured document may reflect, overlap with, and/or include the content within the corresponding unstructured document. An exemplary matched set of structured and unstructured documents may include an annual XBRL filing with the US SEC and its unstructured representation in the form of a 10-K filing, respectively.

Fact module 22 may be configured to identify numeric instances present in the documents obtained by document module 20. Identifying a numeric instance may include locating the numeric instance in a document and determining the number expressed by the numeric instance. The number may refer to the numeric value represented by the numeric instance. As discussed above, a single number may be represented in a variety of ways. Fact module 22 may be configured to determine the number expressed by a numeric instance based on the digits and/or text of the numeric instance itself and/or based on the contextual information for the numeric instance.

Structured context module 24 may be configured to determine structured contextual information for the individual numeric instances identified by fact module 22 in the structured document. The structured contextual information may be determined from the structured document and/or from other sources. The structured contextual information may be related to and/or include one or more of a cluster, a semantic label, a tag, and/or other structural information. In some implementations, structured context module 24 may be configured to determine structured contextual information for each numeric instance in the structured document identified by fact module 22. In some implementations, structured context module 24 may be configured to determine structured contextual information for a portion of the numeric instances in the structured document identified by fact module 22.

Uniqueness module 26 may be configured to determine the uniqueness of the individual ones of the numeric instances identified by fact module 22 in the structured document. In some implementations, a unique numeric instance may express a unique number relative to the other individual ones of the numeric instances in the structured document. A non-unique numeric instance may express the same number relative to one or more other individual one of the numeric instances in the structured document.

Figure 2:
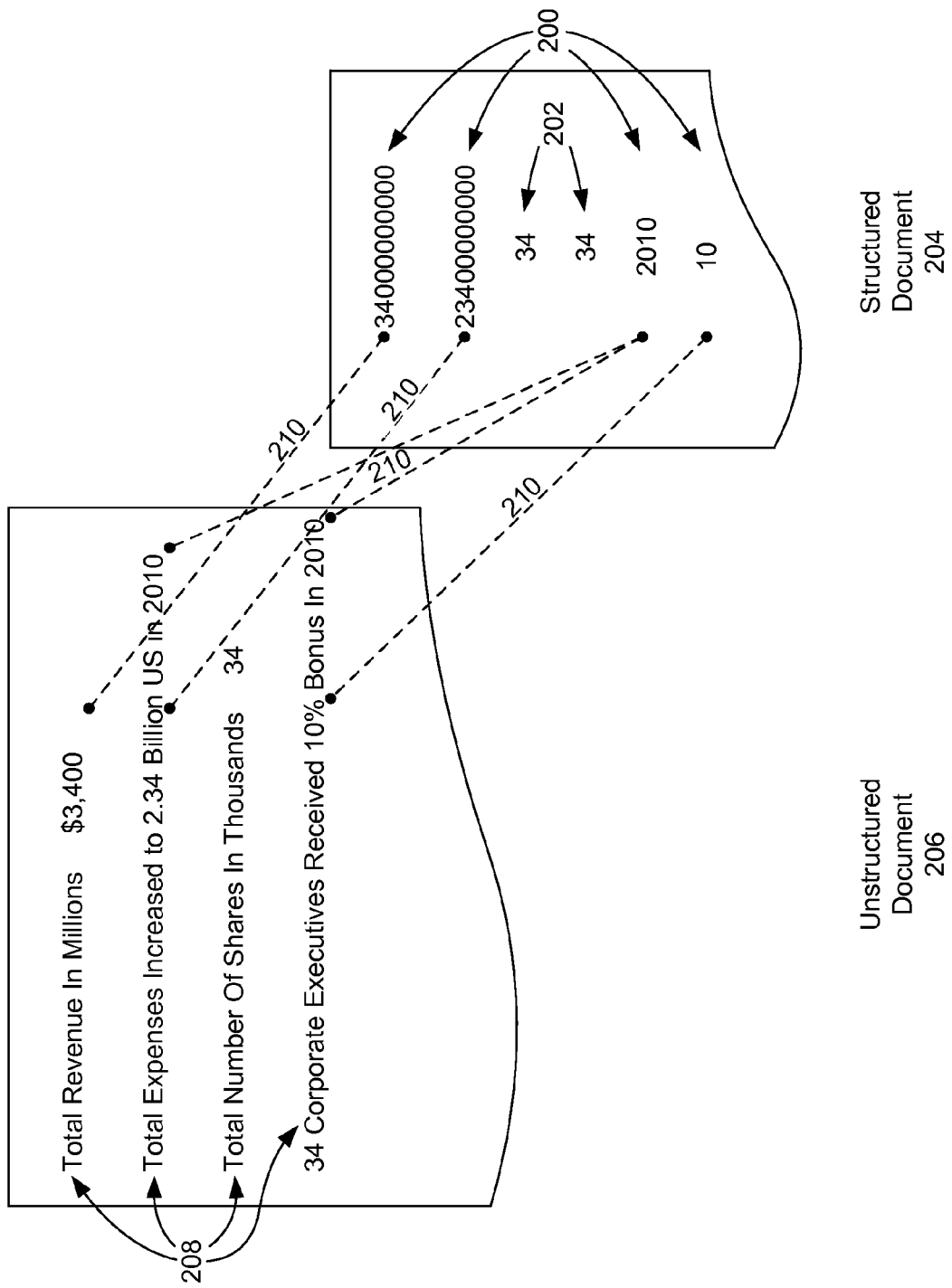
FIG. 2 illustrates unique and non-unique numeric instances in a structured document.

By way of a non-limiting example, FIG. 2 illustrates unique 200 and non-unique 202 numeric instances in a structured document 204. In FIG. 2, the number 34 appears twice in structured document 204. The relationship between the two non-unique numeric instances of the number 34 in structured document 204 and the numeric instances of the number 34 in an unstructured document 206 is not clear. Unstructured contextual information 208 associated with unstructured document 206 indicates that the two instances of the number 34 in structured document 204 may indicate quantities related to two different subjects. By contrast, the relationships 210 between unique numeric instances 200 in structured document 204 and the corresponding numeric instances in unstructured document 206 are clear.

Returning to FIG. 1, Correlation module 28 may be configured to correlate the uniquely identified numeric instances in the structured document with corresponding numeric instances in the unstructured document. Uniquely identified numeric instances in the structured document expressing a common number with a numeric instance in the unstructured document may be correlated with the numeric instance in the unstructured document. Numeric instances in the structured document may be uniquely identified by uniqueness module 26, and/or other modules. As such, correlation of a first uniquely identified numeric instance in the structured document and a second numeric instance in the unstructured document may be responsive to the first uniquely identified numeric instance and the second numeric instance expressing a first number. The correlation of unique numeric instances from the structured document with numeric instances from the unstructured document may be used as common reference points in the structured and unstructured document. These common reference points may be used to identify relationships between the content in the different documents surrounding the reference points (e.g., as described below).

Disambiguation module 30 may be configured to obtain differentiated data sets associated with one or more individual ones of the non-unique numeric instances in the structured document. Disambiguation module 30 may be configured to obtain the differentiated data sets for one or more individual ones of the numeric instances in the structured document responsive to uniqueness module 26 determining that the one or more individual ones of the numeric instances in the structured document are not unique. In some implementations, the differentiated data sets may be used by disambiguation module 30 to differentiate the individual ones of the non-unique numeric instances from other individual ones of the non-unique numeric instances with the same numeric value. For example, responsive to a first numeric instance being non-unique, the disambiguation module may obtain a differentiated data set associated with the first numeric instance. The first (non-unique) numeric instance may be correlated with a corresponding numeric instance in the unstructured document by correlation module 28 based on the differentiated data set associated with the first numeric instance.

In some implementations, a differentiated data set obtained by disambiguation module 30 for a non-unique numeric instance may include structured contextual information assigned to the first numeric instance, for example. The structured contextual information may be related to and/or include one or more of a cluster, a semantic label, a tag, and/or other structural information. The structured contextual information may be determined by structured context module 24. The differentiated data set may include information related to the non-unique numeric instance from the structured document in addition to and/or instead of the structured contextual information. Such information may include attributes of the structured contextual information, unit references (e.g., currency and/or unit of measure), dimensional constructs (e.g., differentiation of multi-dimensional data using XBRL dimensions), surrounding properties (reporting period, reporting entity), information entered by a user via user interface 14, customized semantic labels, and/or other information.

In some implementations, the differentiated data set may include information related to structured contextual information assigned to unique numeric instances related to the first numeric instance (non-unique). The differentiated data set may include information related to the unique numeric instances from the structured document in addition to and/or instead of the structured contextual information. In some implementations, disambiguation module 30 may be configured to traverse the structured document to discover structured contextual information, attributes of the structured contextual information, unit references, dimensional constructs, surrounding properties, information entered by a user via user interface 14, and/or other information associated with the unique numeric instances related to the first numeric instance. The first numeric instance (non-unique) may be differentiated from other individual ones of the non-unique numeric instances with the same numeric value by disambiguation module 30 based on the information associated with the unique numeric instances that are related to the first numeric instance.

Related unstructured contextual information module 32 may be configured to differentiate individual ones of the non-unique numeric instances responsive to disambiguation module 30 being unable to obtain a differentiated data set related to an individual non-unique numeric instance (e.g., the first numeric instance described above). Related unstructured contextual information module 32 may differentiate the individual ones of the non-unique numeric instances based on unstructured contextual information in the unstructured document that is related to the non-unique numeric instances in the structured document. In some implementations, the related unstructured contextual information may include one or more of information related to a unit reference, a sentence, a phrase, a header, table row/column labels, an absolute value, and/or other unstructured information related to the numeric instances. Any combination of this contextual information set may be created to further identify individual occurrences (e.g., a header and table/column row labels could be used as a combination to uniquely identify a specific numeric value). In some instances, either context information for the unstructured document that has been derived from module 32 or by doing other types of comparisons using natural language processing (described in the paragraphs below) techniques may be utilized to disambiguate and associate specific numeric values in the unstructured document with a corresponding numeric value in the structure document.

The related unstructured contextual information may include a first piece of related unstructured contextual information associated with the first numeric instance. Related unstructured contextual information module 32 may be configured to determine the first piece of unstructured contextual information associated with the first numeric instance and relate the first piece of unstructured contextual information to the first numeric instance. The first numeric instance (non-unique) may be differentiated from other individual ones of the non-unique numeric instances with the same numeric value based on the relation between the first piece of unstructured contextual information and the first numeric instance. The first numeric instance may then be correlated with a corresponding numeric instance in the unstructured document by correlation module 28 based on the relation between the first piece of unstructured contextual information and the first numeric instance by related unstructured contextual information module 32.

For example, a non-unique numeric instance in a structured document may be represented in an absolute form, "1000000". The same number may be represented in the unstructured document as a table entry of "$1.0" (first representation) and/or in a sentence stating "$1 million" (second representation). In the first representation ("$1.0"), unstructured contextual information may include information related to the dollar sign, information related to other numbers within the table, table row and/or column labels, and/or other information. In the second representation ("$1 million"), unstructured contextual information may include information related to the word "million", information related to the surrounding sentence, and/or other information. Related unstructured contextual information module 32 may be configured to determine that the unstructured contextual information from the first representation and the second representation are both associated with the numeric instance and relate the unstructured contextual information to the numeric instance.

As a second example, a concept name associated with a numeric instance in the structured document may be deconstructed into its constituent words. The deconstructed numeric instance may be compared to the sentence, header, labels, and/or other markers of the appearances of the numeric instance that are present in the unstructured document. The numeric instance in the unstructured document that has the highest correlation to the constituent words of the concept taken from the structured document may be related to the numeric instance by related unstructured contextual information module 32.

In some implementations, related unstructured contextual information module 32 may be configured to determine unstructured contextual information for the individual, correlated numeric instances correlated by correlation module 28. For a numeric instance in a structured document being correlated with a numeric instance in an unstructured document, related unstructured contextual information module 32 may be configured to determine the unstructured contextual information. The unstructured contextual information may be determined from the unstructured document.

Context association module 34 may be configured to associate the structured contextual information with unstructured contextual information for correlated numeric instances. For example, responsive to correlation of the first numeric instance with the second numeric instance, context association module 34 may associate the structured contextual information for the first numeric instance with the unstructured contextual information for the second numeric instance. Such correlations may include associating textual content appearing alongside a numeric instance in an unstructured document with structured information (e.g., semantic labels, dimensions, and/or other structured structure) associated with a numeric instance in a structured document.

Processor 12 may be configured to provide information processing capabilities in system 10. As such, processor 12 may include one or more of a digital processor, an analog processor, a digital circuit designed to process information, an analog circuit designed to process information, a state machine, and/or other mechanisms for electronically processing information. Although processor 12 is shown in FIG. 1 as a single entity, this is for illustrative purposes only. In some implementations, processor 12 may include a plurality of processing units. These processing units may be physically located within the same device, or processor 12 may represent processing functionality of a plurality of devices operating in coordination (e.g., in a client/server architecture, in a peer-to-peer architecture, in a virtualized architecture, and/or in other relationships). Processor 12 may be configured to execute modules 20, 22, 24, 26, 28, 30, 32, and/or 34 by software; hardware; firmware; some combination of software, hardware, and/or firmware; and/or other mechanisms for configuring processing capabilities on processor 12.

It should be appreciated that although modules 20, 22, 24, 26, 28, 30, 32, and/or 34 are illustrated in FIG. 1 as being co-located within a single processing unit, in implementations in which processor 12 includes multiple processing units, one or more of modules 20, 22, 24, 26, 28, 30, 32, and/or 34 may be located remotely from the other modules. The description of the functionality provided by the different modules 20, 22, 24, 26, 28, 30, 32, and/or 34 described herein is for illustrative purposes, and is not intended to be limiting, as any of modules 20, 22, 24, 26, 28, 30, 32, and/or 34 may provide more or less functionality than is described. For example, one or more of modules 20, 22, 24, 26, 28, 30, 32, and/or 34 may be eliminated, and some or all of its functionality may be provided by other ones of modules 20, 22, 24, 26, 28, 30, 32, and/or 34. As another example, processor 12 may be configured to execute one or more additional modules that may perform some or all of the functionality attributed herein to one of modules 20, 22, 24, 26, 28, 30, 32, and/or 34.

User interface 14 may be configured to provide an interface between system 10 and the user through which the user may provide information to system 10. This enables data, textual content, commands, and/or instructions and any other communicable items, collectively referred to as "information," to be communicated from the user to system 10. Examples of interface devices suitable for inclusion in user interface 14 include a keypad, buttons, switches, a keyboard, knobs, levers, a touch screen, and/or a microphone.

It is to be understood that other communication techniques, either hard-wired or wireless, are also contemplated by the present disclosure as user interface 14. For example, the present disclosure contemplates that user interface 14 may be integrated with a removable storage interface provided by electronic storage 18. In this example, information may be loaded into system 10 from removable storage (e.g., a smart card, a flash drive, a removable disk, etc.) that enables the user(s) to load information to system 10. Other exemplary input devices and techniques adapted for use with system 10 as user interface 14 include, but are not limited to, an RS-232 port, RF link, an IR link, modem (telephone, cable or other). In short, any technique for communicating information with system 10 is contemplated as user interface 14.

Display 16 may be configured to present visual information to a user. The visual information may comprise information determined by processor 16, information entered by a user via user interface 14, information stored in electronic storage 18, and/or other information. Display 16 may be configured to present information automatically, and/or responsive to a request from a user via user interface 14. By way of non-limiting example, display 16 may include one or more of a touchscreen, a television, a projector, a three dimensional display, a computer monitor, and/or other display devices.

Electronic storage 18 may comprise electronic storage media that electronically stores information. The electronic storage media of electronic storage 18 may include one or both of system storage that is provided integrally (e.g., substantially non-removable) with system 10 and/or removable storage that is removably connectable to system 10 via, for example, a port (e.g., a USB port, a firewire port, etc.) or a drive (e.g., a disk drive, etc.). Electronic storage 18 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 18 may include one or more virtual storage resources (e.g., cloud storage, a virtual private network, and/or other virtual storage resources). Electronic storage 18 may store software algorithms, information determined by processor 12, information received from the user (e.g., through input device 14), and/or other information that enables system 10 to function as described herein.

Figure 3:
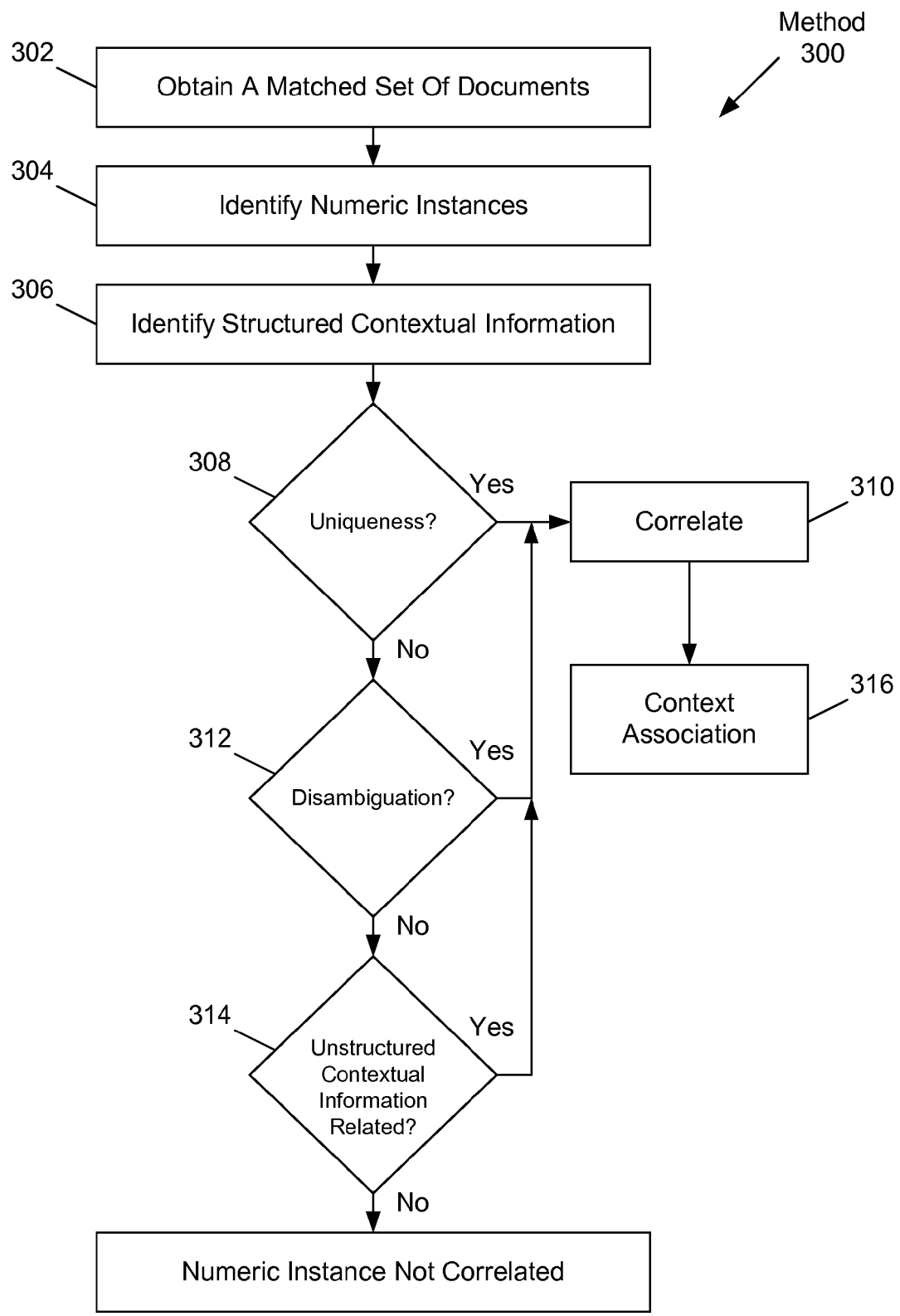
FIG. 3 illustrates a method for facilitating associating structured content in a structured document with unstructured content in an unstructured document.

FIG. 3 illustrates a method 300 to facilitate associating structured content in a structured document with unstructured content in an unstructured document. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302 a matched set of documents may be obtained. The matched set of documents may include a structured document and an unstructured document. In some implementations, operation 302 may be performed by a document module the same as or similar to document module 20 (shown in FIG. 1 and described herein).

At an operation 304, numeric instances within the structured document and the unstructured document may be identified. This may include identifying a first set of numeric instances in the structured document and a second set of numeric instances in the unstructured document. The first set of numeric instances may include a first numeric instance expressing a first number. In some implementations, operation 304 may be performed by a fact module the same as or similar to fact module 22 (shown in FIG. 1 and described herein).

At an operation 306, structured contextual information for the individual numeric instances may be determined. In some implementations, structured contextual information may be determined for each numeric instance in the structured document. In some implementations, structured contextual information may be determined for a portion of the numeric instances in the structured document. In some implementations, operation 306 may be performed by a structured context module the same as or similar to structured context module 24 (shown in FIG. 1 and described herein).

At an operation 308, the uniqueness of the individual ones of the numeric instances in the structured document may be determined. In some implementations, a unique numeric instance may express a unique number relative to the other individual ones of the numeric instances in the structured document. A non-unique numeric instance may express the same number relative to one or more other individual one of the numeric instances in the structured document. In some implementations, the uniqueness of the first numeric instance may be determined. Responsive to the first numeric instance being unique, method 300 may continue at operation 310. Responsive to the first numeric instance being not unique, method 300 may continue at operation 312. In some implementations, operation 308 may be performed by a uniqueness module the same as or similar to uniqueness module 26 (shown in FIG. 1 and described herein).

At an operation 310, numeric instances in the matched set of documents may be correlated. The correlation module may be configured to identify a corresponding second numeric instance present in the second set of numeric instances in the unstructured document, and correlate the first numeric instance with the second numeric instance. In some implementations, operation 310 may be performed by a correlation module the same as or similar to correlation module 28 (shown in FIG. 1 and described herein).

At an operation 312, differentiated data sets may be obtained. The differentiated data sets may be associated with non-unique numeric instances in the structured document. Association with a differentiated data set may differentiate a non-unique numeric instance from other non-unique numeric instances with the same numeric value. Responsive to the first numeric instance being non-unique, a differentiated data set associated with the first numeric instance may be obtained. The differentiated data set may include structured contextual information assigned to the first numeric instance. In some implementations, operation 312 may be performed by a disambiguation module the same as or similar to disambiguation module 30 (shown in FIG. 1 and described herein). Responsive to obtaining a differentiated data set associated with the first numeric instance, method 300 may continue at operation 310. Responsive to not obtaining a differentiated data set associated with the first numeric instance, method 300 may continue at operation 314.

At an operation 314, individual ones of the non-unique numeric instances may be differentiated based on unstructured contextual information in the unstructured document that is related to the non-unique numeric instances in the structured document. The unstructured contextual information may include a first piece of unstructured contextual information associated with the first numeric instance. Responsive to being unable to obtain a differentiated data set associated with the non-unique first numeric instance, the first piece of unstructured contextual information associated with the first numeric instance may be determined, and the first piece of unstructured contextual information may be related to the first numeric instance. In some implementations, operation 314 may be performed by a related unstructured contextual information module the same as or similar to related unstructured contextual information module 32 (shown in FIG. 1 and described herein). Responsive to differentiation of the first numeric instance, method 300 may continue at operation 310. Responsive to not differentiating the first numeric instance, method 300 may end with the first numeric instance not correlated.

At an operation 316, the structured contextual information may be associated with unstructured contextual information for correlated numeric instances. Responsive to correlation of the first numeric instance with the second numeric instance, the structured contextual information for the first numeric instance may be associated with unstructured contextual information for the second numeric instance. In some implementations, operation 316 may be performed by a context association module the same as or similar to context association module 34 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to facilitate associating structured content in a structured document with unstructured content in an unstructured document, the system comprising:
   one or more processors configured to:
   obtain an unstructured document, and generate a structured document from the unstructured document, wherein the structured document has content related to the unstructured document, wherein the structured document is generated from the unstructured document by:
   analyzing human-readable textual content in the unstructured document,
   segmenting the human-readable textual content into individual unstructured content fragments based on the analysis, the unstructured content fragments being contiguous sections of textual content in the unstructured document,
   applying tags to the unstructured content fragments, and
   generating the structured document based on the tags and the unstructured content fragments such that the segmented unstructured content fragments from the unstructured document correspond to the structured content fragments in the structured document;

identify numeric instances present in the structured document and the unstructured document, wherein the numeric instances include a first set of numeric instances present in the structured document and a second set of numeric instances present in the unstructured document, wherein the first set of numeric instances includes a first numeric instance appearing in the structured document within a first structured content fragment;

determine uniqueness of the individual ones of the first set of numeric instances present in the structured document, wherein a unique numeric instance expresses a unique first number; and correlate structured content fragments in the structured document with unstructured content fragments in the unstructured document responsive to the first numeric instance being unique, such that the first numeric instance in the structured document is correlated with an unstructured content fragment in the unstructured document.

2. The system of claim 1, wherein the one or more processors are further configured to:

obtain differentiated data sets associated with non-unique numeric instances in the structured document that differentiate the non-unique numeric instances from other non-unique numeric instances with the same numeric value such that, responsive to the first numeric instance being non-unique, a differentiated data set is associated with the first numeric instance, the differentiated data set including structured contextual information assigned to the first numeric instance; and correlate structured content fragments in the structured document with unstructured content fragments in the unstructured document, such that, responsive to obtaining the differentiated data set associated with the first numeric instance in the structured document, the first structured content fragment is correlated with an unstructured content fragment containing a second numeric instance from the second set of numeric instances in the unstructured document subsequent to an identification of the second numeric instance that corresponds to the first numeric instance.

3. The system of claim 2, wherein the differentiated data set includes information related to structured contextual information assigned to unique numeric instances related to the first numeric instance.

4. The system of claim 2, wherein the one or more processors are further configured to determine the structured contextual information for the first numeric instance.

5. The system of claim 4, wherein the structured contextual information is related to one or more of a cluster, a semantic label, or a tag.

6. The system of claim 4, wherein the one or more processors are further configured to associate the structured contextual information with unstructured contextual information for correlated numeric instances, and wherein, responsive to correlation of the first numeric instance with the second numeric instance, the structured contextual information for the first numeric instance is associated with unstructured contextual information for the second numeric instance.

7. The system of claim 2, wherein the one or more processors are further configured to differentiate individual ones of the non-unique numeric instances based on unstructured contextual information in the unstructured document that is related to the non-unique numeric instances in the structured document, wherein the related unstructured contextual information includes a first piece of unstructured contextual information associated with the first numeric instance, such that, responsive to a failure to obtain a differentiated data set associated with the non-unique first numeric instance, the first piece of unstructured contextual information is determined that is associated with the first numeric instance; wherein the first piece of unstructured contextual information is related to the first numeric instance, wherein the first numeric instance is correlated to the second numeric instance based on the first piece of unstructured contextual information.

8. The system of claim 7, wherein related unstructured contextual information includes one or more of information related to a unit reference associated with the numeric instances, or information related to an absolute value of the numeric instances.

9. The system of claim 1, wherein responsive to the determination that the first numeric instance in the structured document expresses a unique first number, the one or more processors are further configured to identify a corresponding second numeric instance present in the second set of numeric instances in the unstructured document that expresses the first unique number and correlates the first numeric instance to the second numeric instance.

10. The system of claim 1, wherein the structured document is an XBRL document.

11. The system of claim 1, wherein the unstructured document is a corporate financial filing.

12. A method to facilitate associating structured content in a structured document with unstructured content in an unstructured document, the method comprising:

obtaining an unstructured document, and generate a structured document from the unstructured document, wherein the structured document has content related to the unstructured document, wherein the structured document is generated from the unstructured document by:

analyzing human-readable textual content in the unstructured document, segmenting the human-readable textual content into individual unstructured content fragments based on the analysis, the unstructured content fragments being contiguous sections of textual content in the unstructured document, applying tags to the unstructured content fragments, and generating the structured document based on the tags and the unstructured content fragments such that the segmented unstructured content fragments from the unstructured document correspond to the structured content fragments in the structured document;

identifying numeric instances present in the structured document and the unstructured document, wherein the numeric instances include a first set of numeric instances present in the structured document and a second set of numeric instances present in the unstructured document, wherein the first set of numeric instances includes a first numeric instance appearing in the structured document within a first structured content fragment;

determining uniqueness of the individual ones of the first set of numeric instances present in the structured document, wherein a unique numeric instance expresses a unique first number; and correlating structured content fragments in the structured document with unstructured content fragments in the unstructured document responsive to the first numeric instance being unique, such that the first numeric instance in the structured document is correlated with an unstructured content fragment in the unstructured document.

13. The method of claim 12, further comprising:

obtaining differentiated data sets associated with non-unique numeric instances in the structured document that differentiate the non-unique numeric instances from other non-unique numeric instances with the same numeric value such that, responsive to the first numeric instance being non-unique, a differentiated data set is associated with the first numeric instance, the differentiated data set including structured contextual information assigned to the first numeric instance; and correlating structured content fragments in the structured document with unstructured content fragments in the unstructured document, such that, responsive to obtaining the differentiated data set associated with the first numeric instance in the structured document, the first structured content fragment is correlated with an unstructured content fragment containing a second numeric instance from the second set of numeric instances in the unstructured document subsequent to an identification of the second numeric instance that corresponds to the first numeric instance.

14. The method of claim 13, wherein the differentiated data set includes information related to structured contextual information assigned to unique numeric instances related to the first numeric instance.

15. The method of claim 13, further comprising determining structured contextual information for the individual numeric instances in the structured document such that structured contextual information is determined for the first numeric instance.

16. The method of claim 15, wherein the structured contextual information is related to one or more of a cluster, a semantic label, or a tag.

17. The method of claim 15, further comprising further comprising correlating individual numeric instances in the structured document with individual numeric instances in the unstructured document and associating the structured contextual information with unstructured contextual information for correlated numeric instances such that, responsive to correlation of the first numeric instance with the second numeric instance, the structured contextual information for the first numeric instance is associated with unstructured contextual information for the second numeric instance.

18. The method of claim 13, further comprising differentiating individual ones of the non-unique numeric instances based on unstructured contextual information in the unstructured document that is related to the non-unique numeric instances in the structured document, wherein the unstructured contextual information includes a first piece of unstructured contextual information associated with the first numeric instance, such that, responsive to being unable to obtain a differentiated data set associated with the non-unique first numeric instance:

the first piece of unstructured contextual information associated with the first numeric instance is determined; and the first piece of unstructured contextual information is related to the first numeric instance, wherein the first numeric instance is correlated to the second numeric instance based on the first piece of unstructured contextual information.

19. The method of claim 18, wherein related unstructured contextual information includes one or more of information related to a unit reference associated with the numeric instances, or information related to an absolute value of the numeric instances.

20. The method of claim 13, wherein responsive to determining that the first numeric instance in the structured document expresses a unique first number, wherein the method further comprises identifying a corresponding second numeric instance present in the second set of numeric instances in the unstructured document that expresses the first unique number and correlating the first numeric instance to the second numeric instance.

21. The method of claim 13, wherein the structured document is an XBRL document.

22. The method of claim 13, wherein the unstructured document is a corporate financial filing.

* * * * *

UNITED STATES PATENT AND TRADEMARK OFFICE
CERTIFICATE OF CORRECTION

| | | |
|---|---|---|
| PATENT NO. | : 9,684,691 B1 | |
| APPLICATION NO. | : 14/834869 | |
| DATED | : June 20, 2017 | |
| INVENTOR(S) | : Bediako George et al. | |

It is certified that error appears in the above-identified patent and that said Letters Patent is hereby corrected as shown below:

On the Title Page

Under Item (72) Inventors, please change:
"George Bediako"
To:
--Bediako George--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*